UNITED STATES PATENT OFFICE.

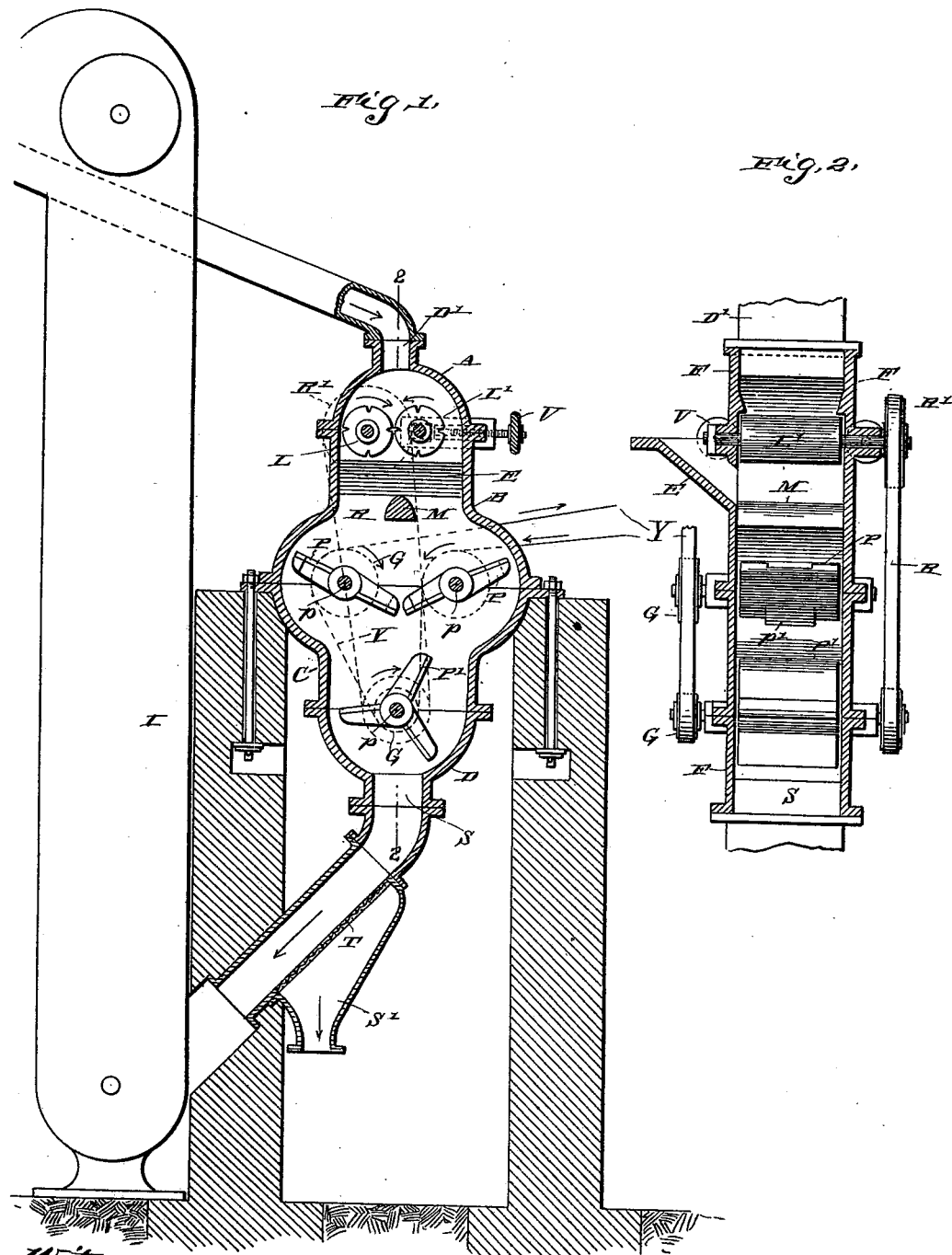

BRUNO MOUSTIER, OF ROQUEVAIRE, FRANCE.

DISINTEGRATING-MACHINE.

SPECIFICATION forming part of Letters Patent No. 675,751, dated June 4, 1901.

Application filed November 15, 1899. Serial No. 737,116. (No model.)

*To all whom it may concern:*

Be it known that I, BRUNO MOUSTIER, engineer, a citizen of the Republic of France, residing at Roquevaire, (Bouches du Rhône,) France, have invented certain new and useful Improvements in Disintegrating-Machines, of which the following is a full, clear, and exact description.

This invention relates to a powdering or disintegrating machine which breaks up, crushes, granulates, and pulverizes by inter-reciprocating shock of the materials and characterized by a special construction and at the same time reducing the wear of the working parts to a minimum, while furnishing means for insuring a large yield.

The accompanying drawings illustrate this apparatus.

Figure 1 is a sectional elevation perpendicular to the axes of the pallets. Fig. 2 is an interior elevation with the casing and hopper in section.

The apparatus is composed of a metallic casing comprising two symmetrical sides formed of a number of parts A B C D, connected together and to the back and front F F. Between these latter are arranged perpendicularly three axes or shafts $p$, on which are mounted pallets or beaters P P P'. The shafts of two of them P P, which are of equal sizes, are in the same plane at right angles to the back and front F F and to the center line 2 2 of the sides A B C D. The shaft of the third pallet P' is situated below the first two and upon the center line 2 2. This pallet P' consists of three wings and each of the other pallets P of only two wings or blades. The wings of these two pallets are furnished at their outer ends with a cut-out portion $p'$ in such fashion as to box their ends one within the other during their rotation in opposite directions, so that the paths or circles which they describe overlap. This peculiarity is important to obtain excellent crushing results, as it causes the paths of the particles to intersect with greater certainty.

Each of the three shafts of the beaters or pallets P P P' is suitably journaled in the walls F F and is furnished exteriorly with a pulley G. Around the three pulleys G passes a driving-band Y, actuated by any suitable means and arranged in such a manner that the two pallets P P turn in opposite directions toward each other at the top—that is, above their shafts $p$—and from each other below the shafts $p$.

In the upper portion of the apparatus are two fining cylinders or rolls L L', mounted on axes parallel to those of the pallets. The cylinder L' is loose on its axis, this latter being mounted in bearings movable in slideways and adjustable by a screw V. The cylinder L' can be brought in contact with the cylinder L, so as to be driven frictionally by this latter, the cylinder L being keyed on its shaft, which is furnished with a pulley R', driven by a band R, receiving its motion from one of the pallet-shafts, for instance.

Above the pallets P P and on the center line 2 2 is a fixed block or distributer M. In the portion above this latter the wall F is furnished with an opening at which is located a charging-hopper E.

The various parts of this machine being driven at the necessary speed, the materials to be crushed are introduced through the hopper E and are divided out, by reason of the distributer M, over the portion corresponding to the center of the pallets P P. The materials are energetically thrown against one another, and thus undergo a first crushing. They afterward fall on the pallet P', having three blades or beaters. This latter acts as a lifter and throws the fragments into the upper portion, restoring them to the working area of the pallets P, and so on, until the materials thus dashed against one another acquire a sufficient degree of fineness to escape the action of the pallets and under the influence of the ventilation produced by the rotation of the pallets to escape through the open exit S at the lower part of the apparatus. The lower pallet or beater P' has a greater number of beater-arms than either of the upper beaters P, so that the lower beater will have a greater capacity for feeding the material upward, thus securing the return of the material into the upper part of the apparatus. After their discharge the particles which fail to pass through a suitable sieve T, located over the outlet S', are brought back by means of a suitable bucket chain or elevator (indicated at I) by means of the opening D', pass between the finishing-rollers L L', the interval between which has been suitably adjusted. They are thus brought to a sufficient degree of fineness to allow them to pass through the sieve T, placed at the bottom of the apparatus. With such an arrangement the three stages, hitherto distinct, of the complete operation of crushing or powdering—namely, breaking up, granulating, and pulverizing—are combined and accomplished in a very simple manner, at the same time reducing to a minimum the wear of the working parts and the expenditure of energy.

I may modify the detail construction of the above apparatus without changing its general arrangement.

Having now described my invention, what I claim as such, and desire to secure by Letters Patent, is—

1. A disintegrating-machine, comprising a casing, two pallets or beaters located therein at the same level and mounted to rotate in opposite directions, one pallet having a cut-out portion to permit of the passage therethrough, of a projection on the other pallet, a third pallet or beater located underneath the two first mentioned, means for feeding the material to be crushed to the upper pallets, and means for rotating the pallets.

2. A disintegrating-machine comprising a casing provided with two feed-openings at different levels, a reducing device at a level between the two feed-openings, another reducing device at a lower level than the lower feed-opening, and an elevator for carrying the imperfectly-crushed material from the bottom of the machine to the upper feed-opening.

3. In a disintegrating-machine, a casing having a feed-opening, pallets or beaters located below said opening to rotate side by side in opposite directions, and a third beater or pallet located below the upper beaters and having a greater number of wings or arms than either of them.

4. A reducing apparatus having a feed-opening, reducing devices below said opening, reducing devices above said opening and in supplying relation to the first-named reducing devices, and a second feed-opening above the second reducing devices.

5. A reducing apparatus having a feed-opening, reducing devices below said opening, reducing devices above said opening, the second-named reducing devices being in supplying relation to the first-named reducing devices, a second feed-opening above the second reducing devices, and means for delivering to the second-mentioned feed-opening material escaping from the first-mentioned reducing devices.

In testimony whereof I have signed my name to this specification in the presence of two subscribing witnesses.

BRUNO MOUSTIER.

Witnesses:
ALBERT BODIN,
J. BUISULOR.